March 1, 1932. K. TAKEDA 1,847,794
PROCESS FOR PATTERNING METALLIC, HOLLOW, AND CYLINDRICAL BODIES
Filed Sept. 9, 1930

Inventor,
K. Takeda
by Chas. J. Williamson
atty.

Patented Mar. 1, 1932

1,847,794

UNITED STATES PATENT OFFICE

KENJIRO TAKEDA, OF NISHIKU, OSAKA, JAPAN

PROCESS FOR PATTERNING METALLIC, HOLLOW AND CYLINDRICAL BODIES

Application filed September 9, 1930. Serial No. 480,789.

The present invention relates to an improved process for patterning the outer or inner surface of metallic, hollow and cylindrical or the like bodies, such as pipes, vessels, etc., by means of a matrix and a roller. The object of the invention is to provide a simple and effective means for patterning, which can be carried out with advantage on an industrial scale. Patterns on metallic pipes used as building material or furniture, metallic vessels of circular form, such as flower vases, table-wares, tea-kettles, coffee-pots, etc., have hitherto been formed exclusively by casting in a mold, or by carving, or by pressing finished articles between male and female matrices. All these methods have the disadvantage that patterns of fine and elaborate design can hardly be produced with facility.

In the present invention such defect can be entirely removed. The finished article is placed in the matrix and pressed out by the roller on the opposite surface. Patterns are curved on the inner or outer surface of the matrix, according as the outer or inner matrix is used. The matrix with the article is revolved and the latter is strongly pressed on the opposite side by the roller where the patterns are to be formed.

A practical application of the present invention is shown by way of example in the accompanying drawings in which.

Figure 1:
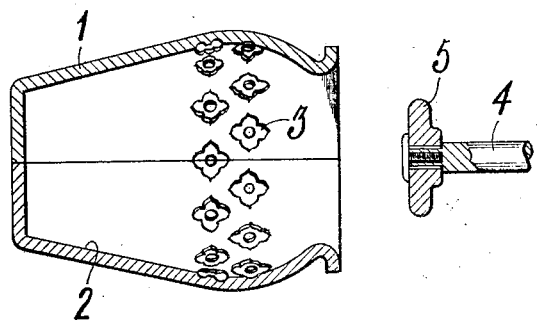
Fig. 1 is a sectional elevation of the matrix and the roller.
Figure 2:
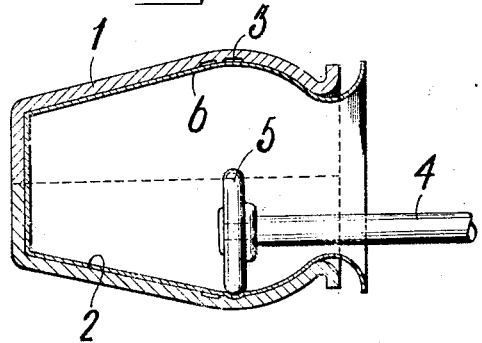
Figs. 2 and 3 show how patterns are formed on the outer or inner surface of the article respectively.
Figure 3:
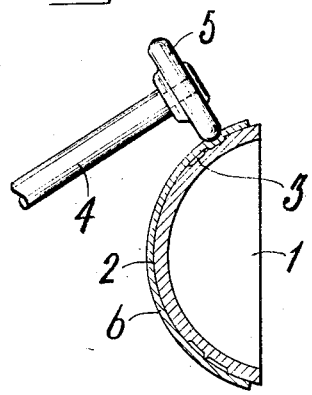

Patterns 3 are carved on the inner or outer surface 2 of the matrix 1, which can be revolved by means of any suitable mechanism and divided into two or more parts when desired. The roller 5 is also revolvably fixed to the lower end of the handle 4. When the article 6 is placed within or covered with the matrix, the outer or inner surface of the article comes in close contact with the inner or outer surface of the matrix. Then the matrix together with the article is set in revolution and the inner or outer surface of the article where patterns are to be formed on the opposite side is pressed down forward and backward by the roller which is also set in revolution. By this movement of the roller the metal is rolled and displaced about the pattern, so that a sharp pattern is produced, while the opposite surface remains smoothly flattened without forming any depression. In Fig. 3 where the matrix is cup-shaped, pattern may be formed on the inner or outer surface of the article, according as the inner or outer matrix is used. In Fig. 3 an inner matrix is shown, that is to say, the article is applied to the exterior of the cup-shaped matrix. In this case there is, of course, no necessity of dividing the matrix.

Claims:—

1. A process for producing a desired pattern on the walls of hollow metallic articles which includes the acts of placing a hollow metallic blank in contact with the curved surface of a matrix within which surface is the desired pattern and then while the matrix and the blank are revolved pressing against the wall of the article opposite the matrix a rotating roller free to be moved in any direction over the surface of the article while in contact therewith.

2. A process as in claim 1 in which the roller has a convexly curved periphery and is of disc form.

KENJIRO TAKEDA.